(12) United States Patent
Chen et al.

(10) Patent No.: US 7,237,342 B2
(45) Date of Patent: Jul. 3, 2007

(54) OPTICAL AXIS ADJUSTING DEVICE FOR USE IN A LASER RULER

(75) Inventors: Hai-hau Chen, Hang-zhou (CN); Hui-qing Chen, Hang-zhou (CN)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/230,577

(22) Filed: Sep. 21, 2005

(65) Prior Publication Data
US 2006/0117585 A1 Jun. 8, 2006

(30) Foreign Application Priority Data
Dec. 7, 2004 (TW) ............... 93137772 A (51) Int. Cl.
*B43L 13/00* (2006.01)
*F16M 11/12* (2006.01)
(52) U.S. Cl. ........................................ 33/286
(58) Field of Classification Search .............. 33/286, 33/227, DIG. 21
See application file for complete search history.

(56) References Cited
U.S. PATENT DOCUMENTS 3,897,637 A * 8/1975 Genho ........................ 33/227
3,909,952 A * 10/1975 Lagasse ...................... 33/227
4,111,564 A * 9/1978 Trice, Jr. ..................... 359/247
4,426,055 A * 1/1984 Reedy et al. ................ 33/286
5,437,104 A * 8/1995 Chien ......................... 33/266
6,052,911 A * 4/2000 Davis ......................... 33/286
6,195,902 B1* 3/2001 Jan et al. ..................... 33/286
6,817,111 B1* 11/2004 Corrado ...................... 33/632
6,823,600 B1* 11/2004 Vaughan ..................... 33/288
6,922,901 B1* 8/2005 Chou et al. .................. 33/290
6,931,740 B2* 8/2005 Marshall et al. ............. 33/286
7,040,030 B2* 5/2006 Sawaguchi .................. 33/290

* cited by examiner

*Primary Examiner*—Christopher W. Fulton
(74) *Attorney, Agent, or Firm*—Troxell Law Office, PLLC (57) ABSTRACT

An optical axis adjusting mechanism disposed on a laser ruler for adjusting an optical axis of the laser ruler is provided. The laser ruler includes a main bracket. The optical axis adjusting mechanism includes a main body rotatably assembled to the main bracket of the laser ruler with a shaft, and one or more adjusting elements for selectively rotating the main body about the shaft to adjust an optical axis of the laser ruler.

18 Claims, 6 Drawing Sheets

FIG. 6

OPTICAL AXIS ADJUSTING DEVICE FOR USE IN A LASER RULER

BACKGROUND OF INVENTION

1. Field of the Invention

The present invention relates to an optical axis adjustment device. More specifically, the present invention relates to an optical axis adjustment device that can properly determine a distance between the viewer and a target object.

2. Description of the Prior Art

A laser ruler is a laser based distance-measuring device, which is an important tool for measuring a distance in the modern industry. The laser ruler operates by measuring a time period in which a laser pulse or laser pulse sequence travels from a laser transmitter to a target object and travels back from the target object to a laser receiver. The distance between the laser ruler and the target object can be obtained by multiplying half of the time period by light speed. An example of the conventional laser based distance-measuring equipment, such as the laser ruler, is disclosed in Taiwan Patent No. 417783, comprising a laser transmitter, a laser receiver perpendicular to the laser transmitter, a prism (or a reflective lens) disposed in front of the laser transmitter on the progressing path of a laser beam transmitted from the transmitter, for reflecting the transmitted laser beam toward the target object. Theoretically, laser beam reflected from the target object is parallel to the optical axis and is received by the laser receiver. By calculating the time period of traveling, a precise distance value is obtained. However, in fact, because the distance between the target object and the laser distance-measuring equipment is finite, a certain included angle between the optical axis of the transmitted laser beam toward the target object and that of reflected laser beam from the target object exists, resulting in an error in distance calculation. In order to avoid the error, position or angle calibration for the prism or the laser transmitter to make the reflected laser beam exactly aiming the center of the laser receiver is required. This indicates that the optical axis of transmitted laser beam reflected by the prism and that of laser beam reflected from the target object exactly intercrosses at the point of target object. Meanwhile, keeping the axis of the transmitted laser beam and that of received laser beam in the same spatial plane is essential.

A conventional adjustment mechanism for use in laser distance-measuring equipment, disclosed in Taiwan Patent No. 417783, comprises a first connecting portion disposed on the main body of the laser distance-measuring equipment, a second connecting portion disposed on the laser transmitter, a pair of bolts disposed between the first connecting portion and the second connecting portion. The second connecting portion is movably engaged with the first connecting portion by using a bolt. In doing so, depending on actual measurement condition and environment, a vertical and horizontal position of the second connecting portion relative to the first connecting position is adjusted by using the bolt, achieving the goal of adjusting the laser distance-measuring equipment. However, it is necessary to install a bolt at the both sides of the laser distance-measuring equipment (as shown in FIG. 5 in Taiwan Patent No. 417783), leading to a larger size of the laser distance-measuring equipment, especially in width, and inconvenience for carrying. Furthermore, the adjustment mechanism can simply calibrate one direction, not meeting the reality requirement for precision measurement in various condition and environment. Therefore, it is necessary to provide an adjustment mechanism for calibrating 3-dimension direction of the laser distance-measuring equipment and capable of reducing the size of the laser distance-measuring equipment, to meet a tendency of size-miniaturizing and high precision for such equipment.

SUMMARY OF INVENTION

It is therefore an object of the present invention to provide an optical axis adjustment mechanism for use in a laser ruler, to miniature the size of the laser ruler.

Briefly described, the present invention discloses an optical axis adjusting mechanism disposed on a laser ruler for adjusting an optical axis of the laser ruler. The laser ruler comprises a main bracket. The optical axis adjusting mechanism comprises a main body rotatably assembled to the main bracket of the laser ruler with a shaft, and one or more adjusting elements for affixing the main body to make the main body rotating around the shaft to adjust the optical axis.

According to the claimed invention, an optical axis adjusting mechanism installed on a laser ruler is disclosed. The laser ruler comprises a secondary bracket with a sink. The optical axis adjusting mechanism comprises a first body accommodated within the sink, comprising a reflection element for conducting the laser beam toward the laser transmitter, a second body rotatably assembled on the secondary bracket of the laser ruler, the second body being rotatably and movably assembled with the first body, a first adjusting element for applying a torque on the second body along a direction of the optical axis of the received light beam, thereby the second body rotating with respect to the secondary bracket, a second adjusting element for applying a torque on the first body along the direction of the optical axis of the received light beam, thereby the first body rotating with respect to the second body, and a third adjusting element disposed between the first body and the second body, for adjusting a distance between the first body and the second body by moving the first body.

According to the claimed invention, an optical axis adjusting mechanism disposed on a laser ruler for adjusting an optical axis of a laser beam from the laser ruler comprises a secondary bracket, disposed on the laser ruler having a supporting plane, a main body, rotatably assembled to the supporting plane with a shaft and through an opening thereon, the main body comprising a laser transmitter, and an adjusting element, for generating a torque applied on the main body to drive the main body rotate with respect to the secondary bracket.

These and other objects of the claimed invention will no doubt become obvious to those of ordinary skill in the art after reading the following detailed description of the preferred embodiment that is illustrated in the various figures and drawings.

DETAILED DESCRIPTION

Figure 1:
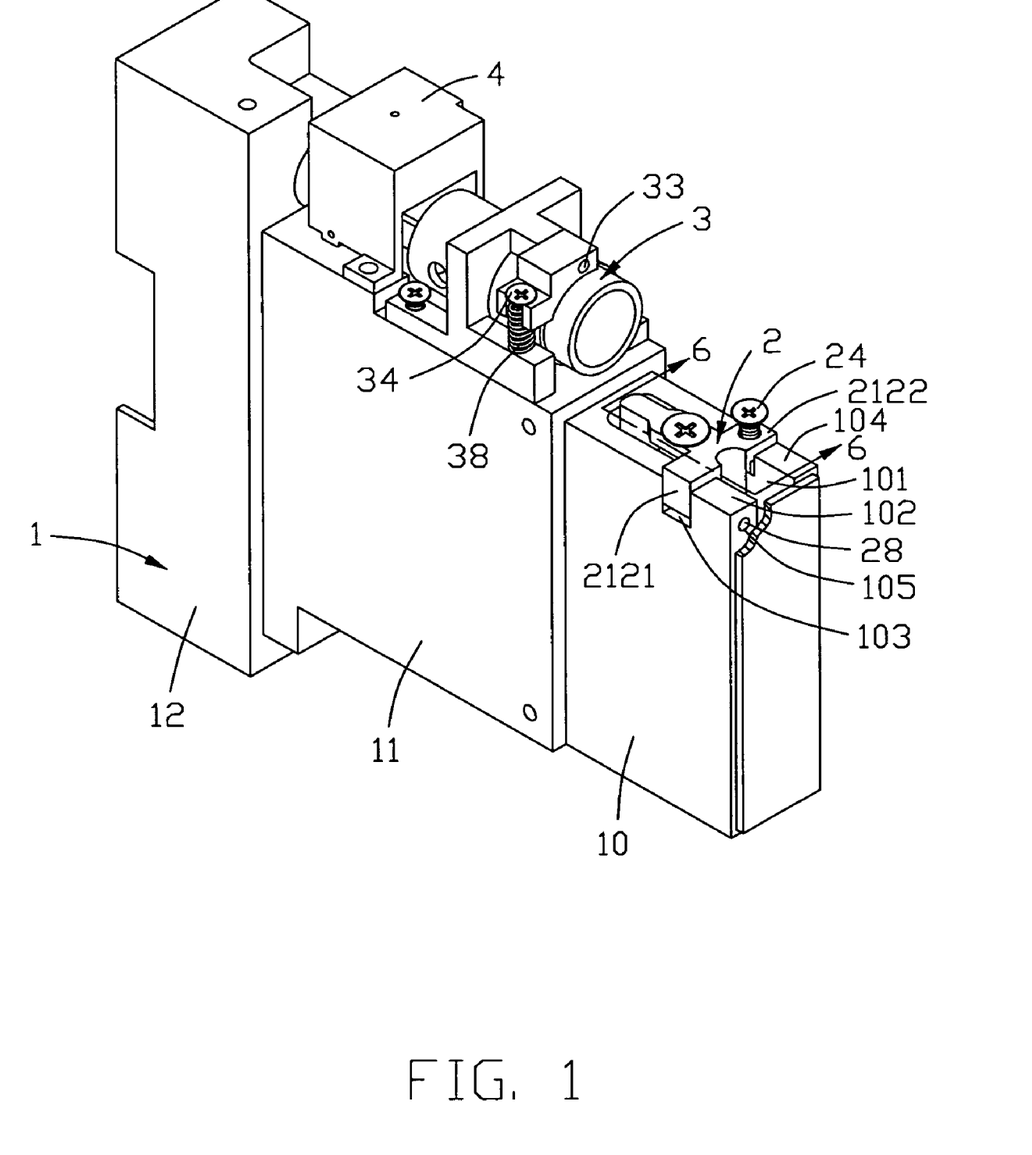
FIG. 1 shows a perspective view of a laser ruler according to the present invention.
Figure 6:
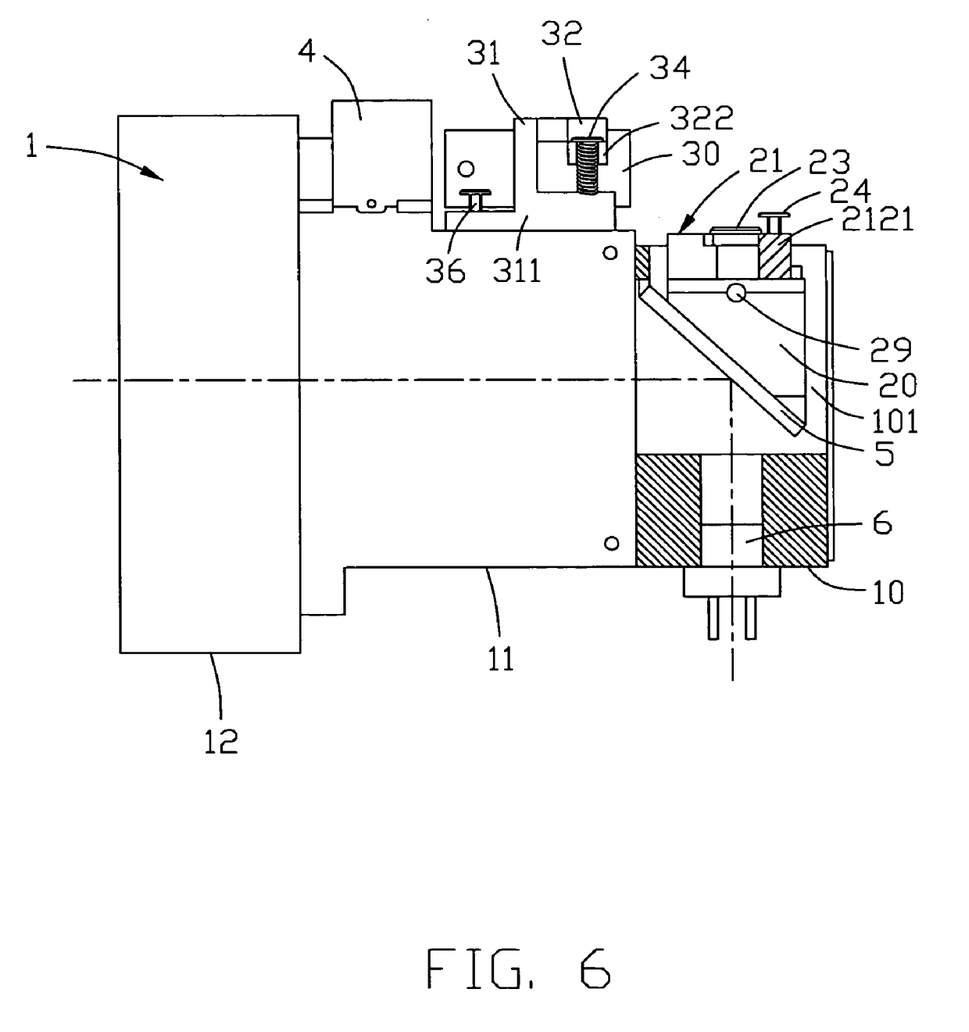
FIG. 6 shows a cross-sectional view of the laser ruler taken along line VI—VI of FIG. 1.

With reference to FIGS. 1 and 6, a laser ruler according to the present invention comprises a main body 1, a first optical axis adjusting mechanism 2 for adjusting the optical axis of a transmitted laser beam and a second optical axis adjusting mechanism 3 for adjusting the optical axis of a received laser beam, an optical shutter 4, a reflection element 5, and a laser receiver 6. The main body 1, which is substantially rectangular, comprises a secondary bracket 10, a second portion 11 and a third portion 12, both being larger in volume than the secondary bracket 10. The secondary bracket 10 has a sink 101 for accommodating the first optical axis adjusting mechanism 2. A notch 103 is defined in first and second side walls 102, 104 of the sink 101. Two shaft holes 105 are respectively formed in the first sidewall 102 on opposite sides of the notch 103.

Figure 2:
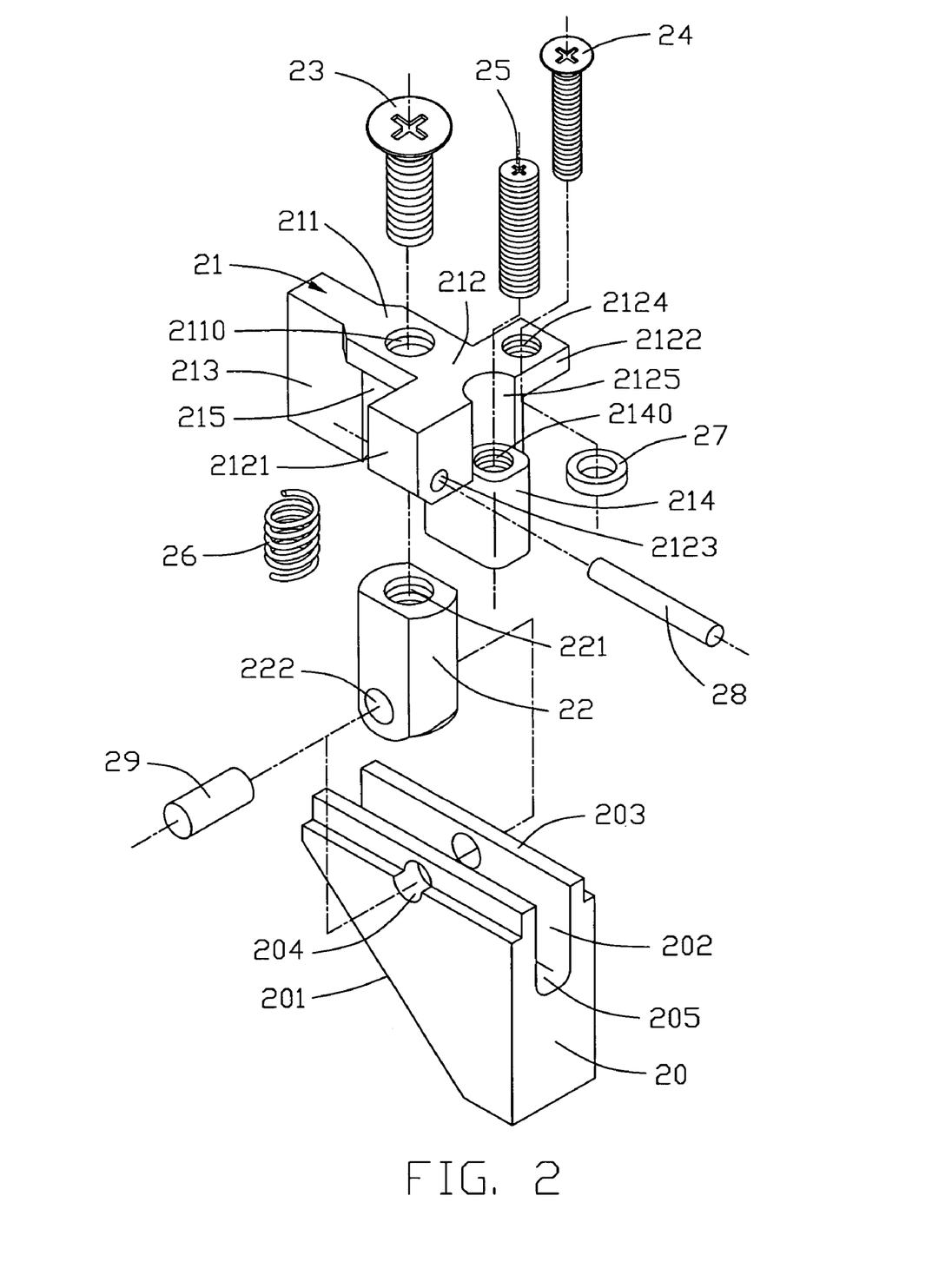
FIG. 2 is an exploded view of a first optical axis adjusting mechanism of the laser ruler according to the present invention.

Referring to FIG. 2, the first optical axis adjusting mechanism 2 comprises a first body 20, which is substantially a trapezoid block having an inclined side and a vertical side substantially perpendicular to long and short edges of the trapezoid, and a second body 21. A reflection element 5 (shown in FIG. 6) an inclined surface 201 defined by the inclined side of the first body 20. A groove 202 is defined in and co-extends with the long edge of the first body 20. Two shaft holes 204 are defined in the middle of two side walls 203 of the groove 202. The second body 21 comprises a main beam 211 in which an inner-threaded hole 2110 is defined, a sub-beam 212 located at an outer end of the main beam 211 and perpendicular to the main beam 211, and a first positioning block 213 integrally formed with an inner end of the main beam 211. The sub-beam 212 comprises a first end portion 2121, which is substantially rectangular, and an opposite second end portion 2122. A shaft hole 2123 extends through the first end portion 2121 in a direction substantially parallel to the extended direction of the main beam 211. The second end portion 2122 defines a through, inner-threaded hole 2124. A second positioning block 214 is extended out of a recess 2125 that is formed in the middle of the sub-beam 212. An inner-threaded hole 2140 is set through the second positioning block 214. In addition, a space 215 is delimited between the first positioning block 216, the sub-beam 212, and the second positioning block 214 for accommodating a connecting member 22, which has constructed as a column. The connecting member 22 defines an inner-threaded hole 221, which corresponds in position to the inner-threaded hole 2110 of the main beam 211, and a shaft hole 222.

Figure 3:
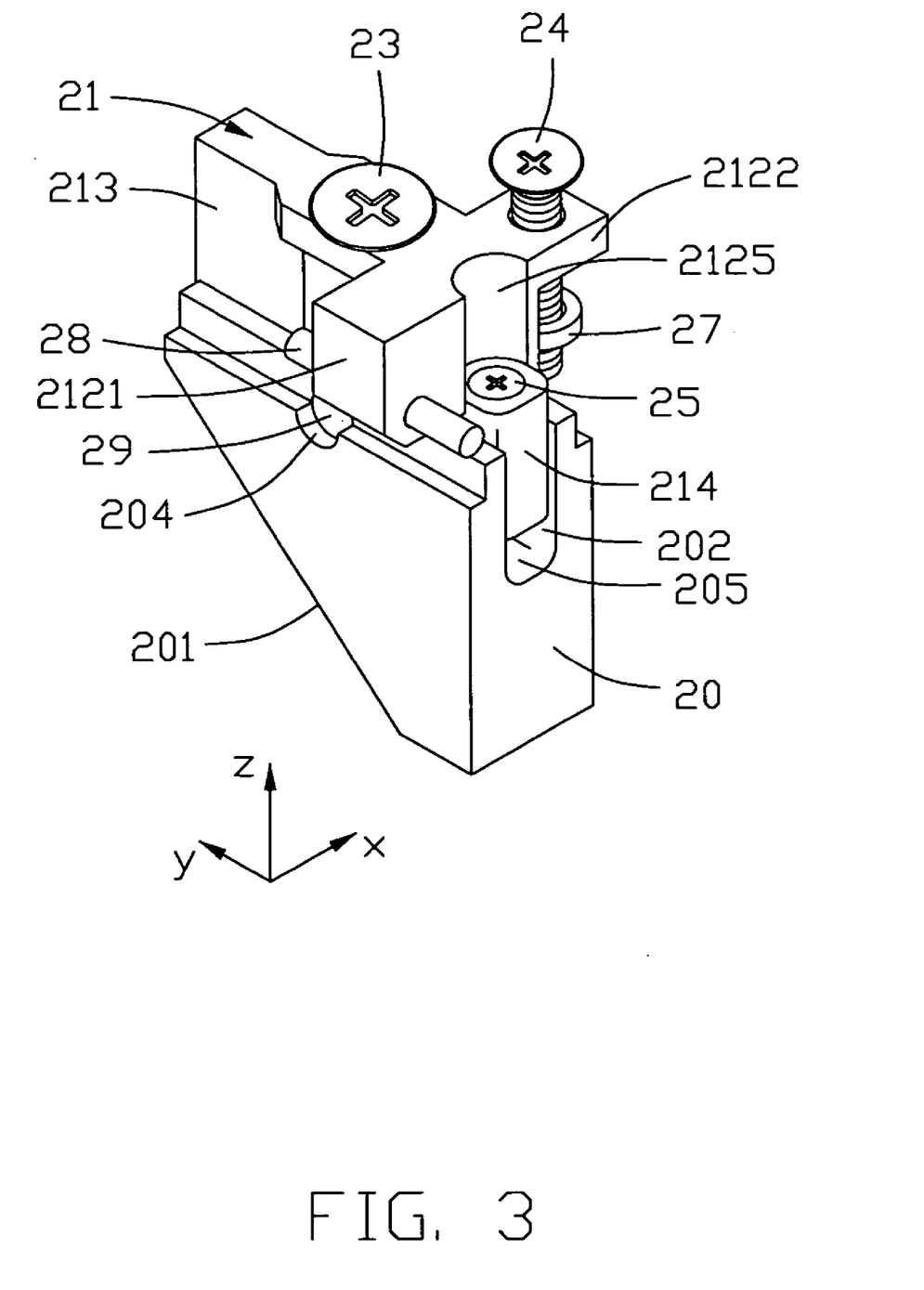
FIG. 3 shows an assembled view of the first optical axis adjusting mechanism shown in FIG. 2.

Referring to FIGS. 2 and 3, a bolt 23 engages and extends through the inner-threaded hole 2110 and into the corresponding inner-threaded hole 221 of the connecting member 22, so as to couple the connecting member 22 to the second body 21. The connecting member 22 is received in the groove 202 with the shaft hole 222 aligning with the shaft holes 204 of the first body 20. A shaft 29 extends through and engages with both the shaft hole 222 and the shaft hole 204 of the first body 20 to affix the first body 20 to the connecting member 22. In this way, the distance between the first body 20 and the second body 21 can be adjusted by means of the bolt 23. Furthermore, a bolt 25 engages with and extends through the inner-threaded hole 2140 of the second positioning block 214 and a lower end of the bolt 25 engages the bottom surface 205 of the groove 202, whereby by adjusting a length of the bolt 25 protruding out of the second positioning block 214, the first body 20 is rotated around the shaft 29, which leads to movement of certain portions of the first body along y-axis, as shown in FIG. 3. Moreover, the first positioning block 213 extends into the groove 202 and engages side walls 203 to prevent movement of the first body 20 relative to the second body 21 along x-axis. A spring 26 is disposed at the bottom of the first positioning block 213, and has one end connected to the first positioning block 213 and the other end connected to the bottom surface 205 of the groove 202, for providing resiliency. FIG. 3 shows first optical axis adjusting mechanism 2 in a completely assembled condition.

The first end portion 2121 and the second end portion 2122 of the first optical axis adjusting mechanism 2 shown in FIG. 3 are respectively assembled with the first side walls 102, 104 of the secondary bracket 10 shown in FIG. 1. The first end portion 2121 and the second end portion 2122 of the first optical axis adjusting mechanism 2 are respectively received in the notches 103 defined in the first and second sidewalls 102, 104, and a shaft 28 extends through the shaft holes 105 and the shaft hole 2123 on the sub-beam 212. Thus, the second body 21 is rotatably assembled with the main body 1. As illustrated in FIGS. 1 and 6, a bolt 24 engages with and extends through the inner-threaded hole 2124 of the second body 21 and further engages with the first side wall 104 of the main body 1. In addition, a spring washer 27 located between the second end portion 2122 of the second body 21 and the second wall 104 serves as a buffer. It is noted that, in the preferred embodiment, the bolt 24 and the shaft 28 are perpendicular to each other but are located in different spatial planes. In this way, by using the bolt 24, a torque is applied on the second body 21 so that the second body 21 and the first body 20 can be rotated around the shaft 28, to adjust the movement of the first body 20 along x-axis.

Figure 4:
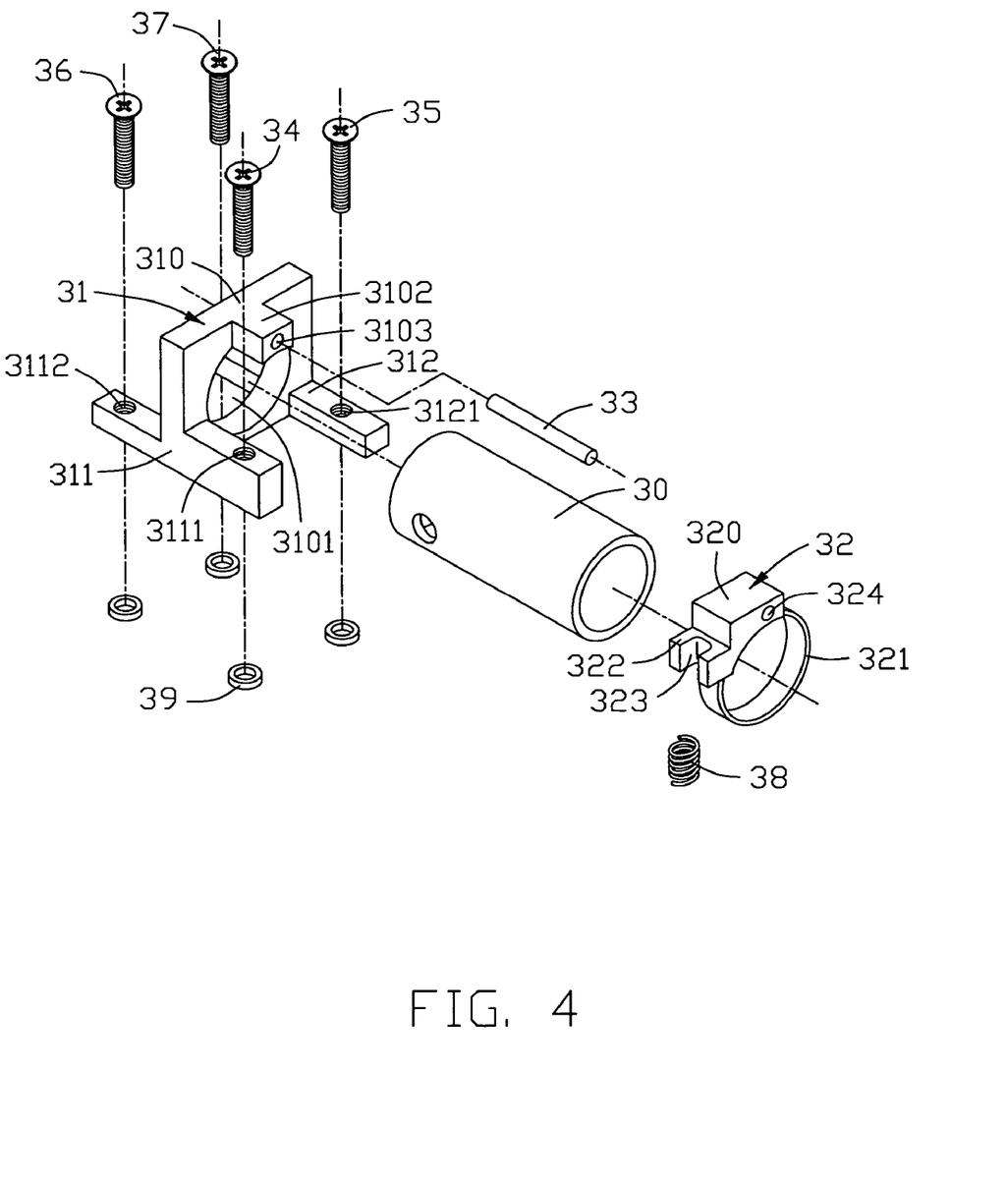
FIG. 4 illustrates an exploded view of a second optical axis adjusting mechanism of the laser ruler according to the present invention.

Referring to FIG. 4, the second optical axis adjusting mechanism 3 comprises a transmitting element body 30, a body main bracket 31, a connecting body 32, and bolts 34, 35, 36, and 37. The transmitting element body 30 shaped as a cylinder in which a laser light resource, such as laser diode (not shown in FIG. 4), is fixed. The cylindrical transmitting element body 30 is coupled to the body main bracket 31 by means of the connecting body 32. The body main bracket 31 comprises a first bottom bar 311 with inner-threaded holes 3111, 3112, a second bottom bar 312 with inner-threaded holes 3121 (only one visible in FIG. 4), and a supporting board 310 which is perpendicular to and fixed between the first bottom bar 311 and second bottom bar 312. The supporting board 310 forms an opening 3101 corresponding in size and shape to the transmitting element body 30. A protrusion 3102 projects from the supporting board 310 and forms a shaft hole 3103. The connecting body 32 comprises a base 320 in which a shaft hole 324 extends and a ring 321 integrally formed with the base 320. The ring 321 has an inner radius identical to outer radius of the cylindrical transmitting element body 30 and also corresponds to an inner radius of the opening 3101. The transmitting element body 30 extends through the ring 321 and the opening 3101 of the body main bracket 31. A connecting end 322 that defines a U-shaped retaining slot 323 is extended out of the base 320.

As shown in FIG. 4, the transmitting element body 30 extends through the ring 321 and the opening 3101 of the supporting board 3101, and the shaft 33 extends through the shaft hole 324 and the shaft hole 3103 of the supporting board 310, to attach the transmitting element body 30 to the body main bracket 31. In addition, a bolt 34 encompassed with a spring 38 is received in the retaining slot 323 and engages with the inner-threaded hole 3111 of the first bottom bar 311, and the bolts 35, 36, 37 engage with corresponding inner-threaded holes 3121, 3112, the second optical axis adjusting mechanism 3 is assembled as shown in FIG. 5.

Figure 5:
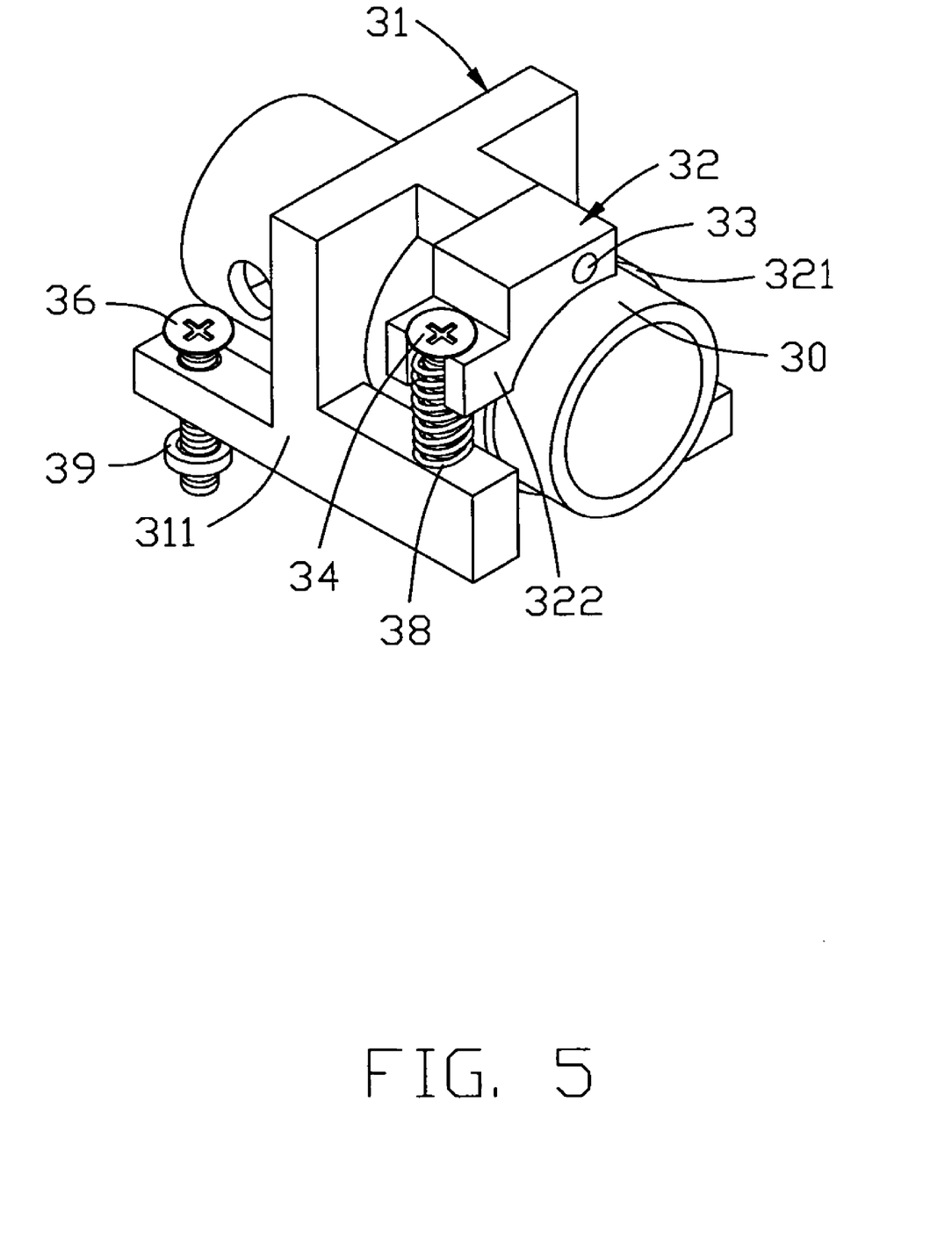
FIG. 5 shows an assembled view of the second optical axis adjusting mechanism shown in FIG. 4.

The second optical axis adjusting mechanism 3 as shown in FIG. 5 is received in the second portion 11 and a spring washer 39 is arranged to provide buffering between the second optical axis adjusting mechanism 3 and the second portion 11. It is noted that the bolt 34 and the shaft 33 are arranged on different spatial planes, and in the preferred embodiment, the bolt 34 and the shaft 33 are perpendicular to each other but are located on different spatial planes. In this way, the bolt 34 in cooperation with the spring 38 can rotate the connecting body 32 and thus the transmitting element body 30 about the shaft 33. Thus, with the aid of bolt 35, an adjustment of the optical axis of the second optical axis adjusting mechanism 3 can be done by using the bolt 34. An initial position of the transmitting element body 30 can be adjusted by using the bolts 36, 37.

As illustrated above, the present invention provides a first optical axis adjusting mechanism 2 for adjusting the optical axis of transmitted laser beam and a second optical axis adjusting mechanism 3 for adjusting the optical axis of the received laser beam. The main body 1 of the laser ruler comprises a secondary bracket 10, a body main bracket 31, a first optical axis adjusting mechanism 2, and a second optical axis adjusting mechanism 3 (having a second body 21, a connecting body 32, and a transmitting element body 30) rotatably assembled with the secondary bracket 10 and the body main bracket 31. By using the bolts, the optical axis adjusting mechanism can be rotated with respect to the laser ruler, achieving the goal of adjusting the optical axis.

In detail, referring back to FIGS. 1 and 3, position (in the z-axis) of the first body 20 of the first optical axis adjusting mechanism 2 relative to the second body 21 can be adjusted based on an adjustment of the bolt 23. In another aspect, an angular displacement of the second body 21 together with the first body 20 around the shaft 28 can be adjusted based on movement of the bolt 24, to achieve an angle calibration with respect to the x-axis for optical axis adjusting mechanism 2. In addition, an angular displacement of the first body 20 around the shaft 29 can be adjusted based on movement of the bolt 25 and the resilience of the spring 26, to achieve an angle calibration with respect to the y-axis for the optical axis adjusting mechanism 2.

As illustrated in FIG. 6, using such adjustment mechanism, the position and the angle of the reflection element 5 can be calibrated to exactly reflect the incident laser into the laser receiver 6, depending on different condition and environment. It is noted that the preferred embodiment of the present invention utilizes the bolts 24, 25 in cooperation with the shafts 28, 29 to rotatably adjust the direction of the optical axis, in contrast to the prior art, a size reduction of the laser ruler due to a less amount of bolts requirement, facilitating the design of size reduction. Besides, because the bolts 23, 24, 25 are positioned from the direction of incident laser beam (i.e. z-axis). That is, the bolts are all located at the same side of the laser ruler, which reduces the amount of space required by the optical axis adjusting mechanism and thus reducing the size of the laser ruler.

In contrast to the prior art, the laser ruler of the present invention requires less number of elements, which facilitates reducing the size of the laser ruler. In addition, by using the adjusting elements, relative positions of the optical axis adjusting mechanism along x-axis, y-axis and z-axis are adjusted.

The present invention has been described with reference to certain preferred and alternative embodiments which are intended to be exemplary only and not limiting to the full scope of the present invention as set forth in the appended claims.

What is claimed is:

1. An optical axis adjusting mechanism installed on a laser ruler, the laser ruler comprising a secondary bracket with a sink, the optical axis adjusting mechanism comprising:
    a first body, accommodated in the sink, comprising a reflection element for directing the laser beam toward a laser transmitter;
    a second body rotatably assembled on the secondary bracket of the laser ruler, the second body being rotatably and movably assembled with the first body;
    a first adjusting element for applying a torque on the second body along a direction of the optical axis of a received light beam, thereby the second body rotating with respect to the secondary bracket;
    a second adjusting element for applying a torque on the first body along the direction of the optical axis of the received light beam, thereby the first body rotating with respect to the second body; and
    a third adjusting element disposed between the first body and the second body, for adjusting a distance between the first body and the second body by moving the first body.

2. The optical axis adjusting mechanism of claim 1, wherein a connecting member is disposed between the first body and the second body.

3. The optical axis adjusting mechanism of claim 2, wherein the connecting member is linked with the second body by means of a screw and is linked with the first body by means of a shaft.

4. The optical axis adjusting mechanism of claim 3, wherein the second body and the secondary bracket links by using a shaft extending through a shaft hole of the second body and a corresponding shaft hole of the secondary bracket.

5. The optical axis adjusting mechanism of claim 4, wherein the first adjusting element is a bolt for screwing into the second body to affix with the secondary bracket.

6. The optical axis adjusting mechanism of claim 5, wherein the second adjusting element is a bolt which is assembled with the second body and contacts to the first body.

7. The optical axis adjusting mechanism of claim 6, wherein the third adjusting element is a bolt which is assembled with the second body and links with the connecting body.

8. The optical axis adjusting mechanism of claim 7, wherein a spring is arranged between the first body and the second body.

9. The optical axis adjusting mechanism of claim 3, wherein the second body and the secondary bracket are coupled y using a shaft extending through a shaft hole of the second body and a corresponding shaft hole of the secondary bracket.

10. The optical axis adjusting mechanism of claim 9, wherein the first adjusting element is a bolt for screwing into the second body to affix with the secondary bracket.

11. The optical axis adjusting mechanism of claim 10, wherein the second adjusting element is a bolt which is assembled with the second body and contacts to the first body.

12. The optical axis adjusting mechanism of claim 11, wherein the third adjusting element is a bolt which is assembled with the second body and links with the connecting body.

13. The optical axis adjusting mechanism of claim 12, wherein a spring is arranged between the first body and the second body.

14. An optical axis adjusting mechanism disposed on a laser ruler for adjusting an optical axis of a laser beam from the laser ruler, comprising:
  a bracket, disposed on the laser ruler, having a supporting plane;
  a main body, rotatably assembled to the supporting plane with a first shaft and through an opening thereon, the main body comprising a laser transmitter; and
  a bolt encompassed by a spring, extending through a slot and engaging the laser ruler, for generating a torque applied on the main body to drive the main body to rotate with respect to the bracket, thereby adjusting a movement of the connecting body with respect to the bracket by adjusting the bolt.

15. The optical axis adjusting mechanism of claim 14, wherein the main body comprises a connecting body and a laser transmitter body having a laser source therein, the laser transmitter body being disposed on the bracket by means of the connecting body.

16. The optical axis adjusting mechanism of claim 15, wherein the connecting body comprises a base and a ring integrally formed with the base, the laser transmitter being affixed with the ring.

17. The optical axis adjusting mechanism of claim 16, wherein the bracket is assembled with the connecting body with a second shaft.

18. The optical axis adjusting mechanism of claim 17, wherein the slot is U-shaped and is extended out of the base.

* * * * *